Sept. 20, 1960   S. B. PRUSSIN ET AL   2,953,284
PRESSURIZED DISPENSER
Filed Dec. 6, 1957
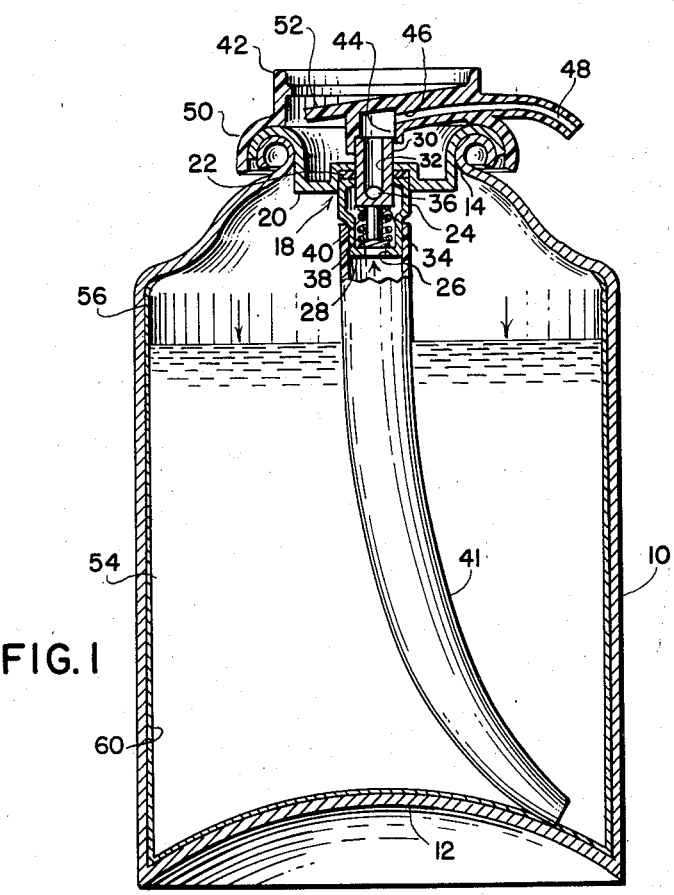
FIG.I
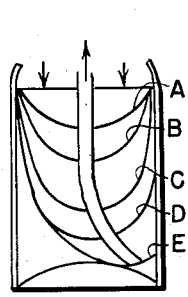
FIG.2
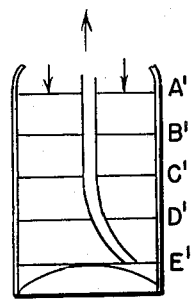
FIG.3
INVENTORS
Samuel B. Prussin,
Fred Presant,
Herman R. Shepherd.
by Kane, Dalsimer and Kane
ATTORNEYS United States Patent Office 2,953,284
Patented Sept. 20, 1960

2,953,284

PRESSURIZED DISPENSER

Samuel B. Prussin, Westport, and Herman R. Shepherd and Fred Presant, Bridgeport, Conn., assignors to Aerosol Techniques, Inc., Bridgeport, Conn., a corporation of New York Filed Dec. 6, 1957, Ser. No. 701,231

4 Claims. (Cl. 222—394)

Our invention relates to a pressurized dispenser in which the bulk substance to be dispensed is characterized as a relatively viscous material.

In dispensing bulk substances by means of a pressurized medium it has been found desirable to have the pressurizing medium function as a piston in forcing the bulk substance through an opened valved outlet orifice which normally forms part of the dispenser. This is particularly significant where the bulk substance is relatively viscous and where the dispensed product should be in a substantially unaerated condition. However, when the packaged bulk substance possesses some degree of viscosity, a piston action by the pressurized propellant is usually not efficiently attained. In most cases a phenomenon which will be referred to as "cavitation" occurs, in which the propellant is discharged through the outlet orifice before a major portion of the bulk substance is dispensed. Cavitation of the bulk substance by the propellant is more pronounced by sustained dispensing and where the relatively viscous bulk substance is not permitted to level off after a particular period of dispensing.

Accordingly, it is a principal object of our invention to provide means for dispensing relative viscous materials by a pressurized propellant acting directly on the upper surfaces of the bulk substance.

Another object is to minimize and in most instances prevent cavitation of a bulk substance to be dispensed by means of a pressurized medium acting directly on the upper surfaces thereof.

A further object is the provision of a lubricating medium in a pressurized dispenser to afford bulk substance lubricity with respect to internal surfaces of the dispenser.

An important object is the utilization of a propellant in a pressurized dispenser in a manner that the characteristics of a viscous bulk substance ultimately dispensed are substantially similar to those of the bulk substance originally introduced into the dispenser.

A further important object is the provision for the complete dispensing of a relatively viscous bulk substance in a dispenser by a piston functioning gaseous propellant by incorporating in the dispenser a lubricating medium for the bulk substance.

The foregoing and other objects, features and advantages of our invention are more fully described in the following specification and drawings, in which:

Fig. 1 is a longitudinal sectional view of a typical pressurized dispenser incorporating the various features of our invention;

Fig. 2 is a schematic view of the lower end of a pressurized dispenser illustrating the formation of cavitation in a viscous bulk substance dispensed by a piston-acting gaseous propellant; and Fig. 3 is a schematic view similar to Fig. 2 showing various levels of a viscous bulk substance after it is partially dispensed by means of a piston-acting gaseous propellant with the incorporation of our inventive features into the dispenser.

The usual pressurized dispenser structure includes an open-topped cylindrical container 10 having a hemispherically-shaped closed bottom 12 and an open end 14 defining a relatively reduced circular opening. Container 10 may be fabricated from glass, plastic, or the usual metallic materials such as steel, cast iron, brass, copper, tin, lead, stainless steel, zinc or aluminum. For most practical applications, drawn or seamed steel cans and drawn or extruded aluminum cans having a capacity up to about 16 ounces, perform satisfactorily.

A typical valve assembly 18 that may form part of our dispenser includes a valve support 20 crimped on the open end 14 of container 10 by any of the conventional techniques. Substantially immovably mounted on the lower side of support 20 are an apertured sealing disk 22 and spring housing and dip tube support 24. The spring housing 24 is conveniently provided with an opening 26 at the lower end thereof defined by a radially-inturned flange 28. Slidably mounted with respect to support 20, disk 22 and housing 24, is a valve stem 30. Valve stem 30 features a coaxial bore 32 extending therethrough but terminating short of closed end 34. A transverse bore 36 extends through valve stem 30 thereby communicating with bore 32 and is adapted to communicate with the interior of housing 24 when the valve stem 30 is depressed to an open position which is illustrated in Fig. 1. Extending from the closed end 34 of valve stem 30 is a coaxially mounted rod 38. Surrounding rod 38 is spring 40 which is adapted to be biased against the internal surface of flange 28 and the exterior face of closed end 34. Under normal conditions when the dispenser is not emitting any bulk substance, spring 40 urges valve stem 30 upward so that transverse bore 36 is disposed within the confines of disk 22. In the latter condition, the bulk substance in the dispenser is not free to be dispensed; and only when the valve stem 30 is sufficiently depressed will the contents be discharged. Mounted on the exterior of housing 24 in a relatively immovable manner is the usual arcuately shaped stand pipe, dip tube or siphon tube 41.

Telescoped on the upper end of valve stem 30 is a cap 42 made of a resilient and flexible plastic material. It will be observed that cap 42 presents a coaxial bore 44 communicating with bore 32. Extending from bore 44 is a transverse bore 46 which extends into a curved spout 48. Cap 42 additionally includes an enlarged circular opened bottom end 50 which is adapted to be resiliently clamped on the crimped edges of support 20. The top of cap 42 presents a finger-pressing surface 52 which is secured to the walls of cap 42 at a zone adjacent spout 48. In this regard, because of the resiliency and flexibility of the cap material and the limited coupling of the finger-pressing surface 52 to the walls of cap 42, the valve stem 30 will be depressed by a pressure exerted on surface 52 to ultimately expose transverse bore 36 to the interior of container 10.

In accordance with our invention, a viscous bulk substance 54 and a pressurized gas propellant 56 are preferably included within our dispenser. It is essential that the bulk substance 54 and propellant 56 be relatively immiscible. It is additionally desirable that these materials be of such a nature that the propellant 56 does not emulsify with the bulk substance 54. Solubility of the gaseous propellant in the bulk substance is a consideration depending upon the dispensing system employed and the desired characteristics of the dispensed product. Accordingly, nitrogen is insoluble and acts satisfactorily with aqueous systems. If carbon dioxide is used with aqueous systems, solubility of the gas with the bulk will occur and an additional amount of gas will be needed to properly fill the container headspace. In the latter aqueous systems utilizing carbon dioxide as the propellant, some expansion of the bulk product will occur upon dispensing which in some instances may be desirable. The bulk substances contemplated to be dispensed preferably assume the same characteristics and form after dispensing as they did prior to introduction into the dispenser. In accomplishing this end, the propellant 56 in a gaseous state must function as a piston directly exerting pressure on the upper surface of the bulk material 54 and not tend to expand the bulk substance as is usual with the employment of propellants in a liquefied state.

However, when a relatively viscous substance is to be dispensed by a piston-acting propellant, cavitation of the bulk substance in most instances occurs, especially upon sustained dispensing. This is attributable to the frictional forces and interfacial tension which are functions of the cohesive forces within the product and the adhesional forces between the product and the internal surface of the container 10. Depending on the viscosity, stiffness and consistency of the bulk substance, as well as the aforementioned frictional forces and interfacial tension, a cavity that is formed during the particular period of dispensing may not level off completely before the next dispensing operation. Consequently, as schematically illustrated in Fig. 2, surface contours develop as denoted by lines A, B, C, D, and E, when an attempt is made to dispense a particular substantially viscous bulk substance. This phenomenon occurs but to a lesser degree when the bulk substance is intermittently extruded.

Of course, each of the lines simulating the various upper surface contours will be more pronounced as the duration of the dispensing cycle increases, with the result that ultimately the formed cavity will reach the opened bottom end of the dip tube 41, thereby permitting propellant 56 to pass through valve 18 and equalize its pressure with that of the ambient atmosphere. As the viscosity of the bulk decreases the degree of cavitation decreases for a particular cycle of intermittent dispensing. However, cavitation will nevertheless be present even for lower viscosity bulk substances when the dispensing is sustained in order that the entire bulk be obtained at once. As the result of the phenomenon of cavitation, we have found that a substantial portion of the bulk substance usually remains within the container 10 and renders a dispenser for viscous materials impractical and commercially unfeasible.

The bulk substance 54 that we contemplate dispensing by a pressurized dispenser may be generally classified as cosmetics, medical and pharmaceutical preparations, food products and the like.

Within the class of cosmetics we may include hand creams and lotions, cleansing creams and lotions, hair creams and lotions, cold creams, depilatory creams and lotions, deodorant creams and lotions, anti-perspirant creams and lotions, shaving creams, emollient facial creams, vanishing creams, suntan creams and lotions, insect repellent creams and lotions, shampoo creams and lotions, and similar viscous cosmetic preparations.

The usual cosmetic creams range in viscosity from below 40,000 to 50,000 centipoises at 25° C. to approximately 250,000 to 300,000 centipoises at 25° C. and above. On the other hand, the usual cosmetic lotions range from approximately 1,000 centipoises at 25° C. to 5,000 centipoises at 25° C. and above, to a point where they lose their identity as lotions and are properly classified as creams.

Included within the medical and pharmaceutical preparations contemplated to be dispensed according to our intention are antibiotic creams and lotions, adolescent skin creams and lotions, anesthetic skin creams and lotions, vitamin suspensions and liquids, and other similar viscous preparations. The viscosity of these preparations commercially in use normally extends from 4,000 centipoises at 25° C. to well over 300,000 centipoises at 25° C., which is the approximate viscosity of most bulk commercial toothpastes.

The food products which may be dispensed include mustard, ketchup, mayonnaise, salad dressings, pâtés, peanut butter, jelly, jams, syrups and other similar viscous food products. Commercial products along these lines usually range in viscosity from 1,000 centipoises at 25° C. and upwards to a substantially non-viscous material.

Various toothpastes, such as those commercially available, are most effectively dispensed according to the teachings of our invention.

Additionally such products as pastes, adhesives and cements ranging in viscosity from 1,000 centipoises and upwards may be advantageously dispensed in accordance with our invention.

For the gaseous propellant 56 we prefer to use nitrogen, carbon dioxide, and nitrous oxide. Usable with our invention also are such gases as helium, argon, neon, krypton, xenon, and compressed air. Similarly, liquefiable chlorinated and fluorinated hydrocarbons and saturated hydrocarbons such as propane and butane are usable preferably in the vapor phase to provide the required piston action when charged to the desirable pressure in the dispenser head space. Obviously, in employing a particular propellant, one must take into consideration the particular bulk substance that is desired to be dispensed. In this connection, the bulk product may require an inert gas, a non-toxic gas, and one incompatible with the bulk substance either physically or chemically. For example, carbon dioxide cannot be employed as a propellant for most shaving creams, primarily because it tends to neutralize fatty acid soaps within the cream which in effect destroys the soap emulsion and expends the carbon dioxide in the head space by chemical reaction with the alkaline bulk. Substantially all of the medical and pharmaceutical preparations require an inert gaseous propellant, for which nitrogen is extremely suitable, or a gas propellant that can be proven safe for use for the particular product application. In regard to food products, a non-toxic and inert propellant is usually required. Other factors to be considered, depending on the particular application for the propellant, include such properties as flammability, irritability, odor, or its ability to corrode the various elements of the dispenser. The degree of pressure of the propellant will obviously depend upon the volume of gas head space in the container and the nature of the bulk substance. The usual six ounce cans (with an actual total volume of approximately 7.3 ounces) containing approximately 4½ avoirdupois ounces of a low specific gravity system such as hydrocarbons, per se, or emulsified with water and of the consistency of lard, or approximately 7 avoirdupois ounces of a product of a much higher specific gravity such as toothpaste, generally require in the neighborhood of 90 p.s.i.g. For most practical applications, the pressure will be a direct function of the consistency, that is, the greater the consistency, the greater the pressure required. The pressure for any system should be established for that particular system in order to obtain quantitative exhaustion of the contents.

In counteracting the aforementioned phenomenon of cavitation, we attain a dispensing action substantially similar to that illustrated in Fig. 3. It will be observed that the various levels of the bulk substance at the expiration of each dispensing cycle are represented by the lines denoted as $A_1$, $B_1$, $C_1$, $D_1$, and $E_1$. We attain this desirable end by incorporating lubricating media in our dispenser. It has been found that lubricating media provides for superior dispensing of bulk substances having viscosities as low as 4,000 centipoises at 25° C. Below this viscosity, a lubricant may not be considered necessary or commercially practical unless the bulk substance possesses extreme cohesiveness which is pronounced in such products as pastes and adhesives, or when the contents of the can are to be entirely dispensed during a single operation. However, for more practical purposes, a lubricant facilitates a dispensing function far superior to those techniques not utilizing such a material.

Lubricants usable with our dispenser are generally selected from the saturated hydrocarbons, fatty acid esters, fatty acids, ethylene oxide condensates, silicone oils, and metallic soaps. The choice of the most suitable lubricating agent or agents will be determined by the type of container used and the nature of the bulk substance to be dispensed. The lubricant should function to prevent adhesion of the bulk with the internal walls of the container and other selected parts of the dispenser as well as adhesion of the bulk with the lubricant itself. For proper lubricating action, some degree of adhesion of the lubricant with the internal walls of the container and other lubricated parts is desirable, thereby rendering the lubricant contiguous with the internal walls and other lubricated parts.

The lubricant adopted for a specific product or bulk substance should be incompatible with the product to the extent that the lubricant does not dissolve in the product and lose its identity as a lubricant. If the lubricant is so compatible with the product, the latter will be contiguous with the inner surfaces of the dispenser can, with the result that cavitation is maximized. In a dispenser system where water is the continuous phase, such as in most toothpastes, certain cosmetic and pharmaceutical preparations, and food products such as ketchup, an hydrophobic lubricant such as mineral oil, silicone oil and fatty acids are preferably considered. Where the continuous phase is lipophilic, an hydrophilic lubricant is preferably employed, such as the polyethylene glycols. Consequently when an oil based bulk substance is used, an oil repellent lubricant should be employed. Conversely, when the bulk substance is water based, then a water repellent lubricant should be adopted. Thus the adhesion of the bulk product with the lubricant or parts of the dispenser may be minimized if not prevented. As a desirable feature, but not a necessary one, the lubricant we employ usually possesses a lower specific gravity than the bulk substance. Under these circumstances, a part of the lubricant will usually be concentrated at the interface between the product and the propellant, thereby further assuring non-adhesion of the bulk in the container to the container walls.

The saturated hydrocarbons include mineral or paraffin oils, petrolatums, paraffins, and microcrystalline waxes as are well known to those skilled in the art, and for the purpose of brevity will not be listed because of the large number usable with our invention. The saturated hydrocarbons selected should afford the bulk lubricity and function in a nature to have the interior surfaces of the can lose their original identity.

Examples of some of the fatty acid esters that may be utilized as a lubricant and range from substantially a liquid to substantially materials of waxy consistency are: the glyceryl esters such as glyceryl (mono)laurate, glyceryl (mono) oleate, glyceryl oleo-stearate, glyceryl (mono) ricinoleate, glyceryl (mono) stearate; the glycol esters such as: diethylene glycol (mono)laurate, diethylene glycol laurate, diethylene glycol oleate, diethylene glycol (mono) ricinoleate, diethylene glycol stearate, ethylene glycol (mono) ricinoleate, ethylene glycol (mono) stearate, propylene glycol (mono) stearate; the polyethylene glycol fatty acid esters such as polyethylene glycol (mono) laurate, polyethylene glycol (di) laurate, carbowax (mono) laurate, polyethylene glycol (mono) oleate, polyethylene glycol (di) oleate, polyoxyethylene oleate, carbowax (di) oleate, polyethylene glycol (mono) ricinoleate, polyethylene (di, tri) ricinoleate, polyethylene glycol (mono) stearate, polyethylene glycol (di) stearate, polyoxyethylene stearate, and carbowax stearate. Additional fatty acid esters are: polyethylene stearate, polyoxyethylene oleate, polyoxyethylene esters of mixed fatty and resin acids, polyoxyethylene lauryl ether, polyoxyethylene sorbitol lanolin derivative, polyoxyethylene sorbitol beeswax derivative, polyoxyethylene lanolin derivative, polyoxyethylene sorbitol lanolin oleate derivative, polyoxyethylene sorbitol hexastearate, polyoxyethylene sorbitol 4.5 oleate, polyoxypropylene mannitol (di) oleate, sorbitan (mono) laurate, sorbitan (mono) palmitate, sorbitan (mono) stearate, sorbitan (tri) stearate, sorbitan (mono) oleate, sorbitan (tri) oleate, sorbitan (sesqui) oleate, polyoxyethylene sorbitan (mono) laurate, polyoxyethylene sorbitan (mono) palmitate, polyoxyethylene sorbitan (mono) stearate, polyoxyethylene sorbitan (tri) stearate, polyoxyethylene sorbitan (mono) oleate, polyoxyethylene sorbitan (tri) oleate, polyoxyethylene oxypropylene stearate, polyoxyethylene oxypropylene oleate.

The fatty acids may include saturated and unsaturated fatty acids from the lower members of the homologous saturated and unsaturated fatty acid series down to below C-8 to the higher molecular weight acids of saturated and unsaturated homologous series up to and beyond C-28. Examples of these fatty acids are: lauric, palmitic, myristic, stearic, oleic and behenic fatty acids.

The ethylene oxide condensates usable with our invention are similarly numerous and may embrace the glycols and carbowaxes. The glycols usable with our invention are similarly numerous and may embrace glycerine, propylene glycol, polyethylene glycols, and polypropylene glycols. Other similar glycols and similar oxide condensates are obviously applicable to our invention.

The silicone oils and metallic soaps that may be utilized for purposes of our invention are likewise numerous and should be apparent to those skilled in the art.

Additionally, fatty alcohols, both saturated and unsaturated may be used for our lubricant. These lubricants may include the lauryl, myristyl, stearyl and oleyl alcohols.

Water dispersions or solutions of gums such as the methyl-celluloses and other dispersible or soluble cellulosic derivatives, certain vinyl alcohols, carrageenate and alginate derivatives, guar, tragacanth, acacia and the like are usuable as lubricants. Similarly, solvent dispersible or soluble gums such as the ethyl celluloses may be employed.

As a lubricating means we may utilize surfactants or surface active agents which normally increase internal slippage of the bulk substance, thereby resulting in a lubricating function. Surfactants are generally classified as anionic, non-ionic, cationic and amphoteric. Surfactants such as lauryl-sulphates and dioctyl sodium sulphosuccinate, have produced satisfactory results by reducing the interfacial tension between the container and bulk substance. Of course, the type of surfactant employed will depend on the nature of the bulk substance.

The lubricant employed is normally applied to the internal walls of the dispenser container as illustrated at numeral 60 by any of the conventional techniques, such as spraying or brushing. Other parts of the container that ultimately come in contact with the bulk substance may be lubricated. In this connection, it may be found that the dip tube will require a lubricating coating.

In order to increase the adhesion of the lubricant with selected surfaces of the dispenser, thereby presenting surfaces with more contiguous lubricating layers, composite lubricant layers may be utilized. In this connection, a lubricating substance of wax consistency is initially applied over the internal walls of the container and other selected parts. Then a liquid lubricant is applied over the wax layer, thereby affording a lubricating media more contiguous with the surfaces selected to be lubricated. This embodiment is applicable to both the water repellent and oil repellent lubricants and each individual lubricant layer should be of such a nature to give the desired results as will be apparent to those skilled in the art from the teachings of the instant disclosure. Accordingly, for an oil base bulk substance, a suitable combination of the polyethylene glycols and carbowaxes can be employed.

Materials presenting lubricating surfaces may be used for coating or forming the various parts of the dispenser. Accordingly, a self-lubricating type of plastic such as polyethylene or plasticized vinyl resins may be employed for the container proper or as an internal coating therefor. However, the results obtainable by using self-lubricating types of plastic materials are not as effective as those obtainable by a separately-applied lubricant similar to those listed above.

We have found that satisfactory bulk lubricity is obtained by inter-mixing a lubricating medium with our bulk substance. The amount of lubricant added to the bulk substance will depend upon the consistency and viscosity of the bulk and the dispersability of the lubricant with respect to the bulk. For example, we have found that for commercial toothpastes ½ to 10% of lubricant will normally minimize cavitation satisfactorily.

In preparing our dispenser, the selected lubricant is first applied to the internal walls of a dispenser container. The dip tube may then be similarly lubricated if desired. The proper amount of bulk material is ordinarily then introduced into the container. Then the valve assembly is applied to the open top of the container and suitably crimped around the neck thereof. The propellent is then gassed through the valve, as is usually done in most commercial processes. The assembled cans are next subjected to a water bath to check for valve and container leaks. Other tests may be performed, depending on the nature of the dispenser assembled. The cap with the dispensing spout may then be coupled to the valve stem and crimped end of the container. Obviously, the steps outlined may be varied to attain the desired end results. For example, after lubricating the internal walls of the container, the valve assembly may be crimped on the open end of the container. The bulk substance and propellent may then be fed through the valve assembly to fill the container in any desired order. For most practical applications, the evacuation of air within the container is not necessary. However, if the presence of air is deemed detrimental, it may easily be removed by one of the many techniques commercially used at present. Additionally, in any of the methods of preparing our dispenser, we may suitably lubricate surfaces of the valve assembly to minimize bulk substance adherence thereto.

When a lubricating plastic is to be employed to afford the desired bulk lubricity, the internal walls of the container may be appropriately coated before insertion therein of the bulk material and propellent. As mentioned above, the container may be entirely fabricated from the selected lubricating resin and subsequently receive the selected bulk material and propellent.

In the embodiment wherein a suitable lubricant is intermixed with the bulk substance, the mixture is usually prepared prior to introducing the constituents into the dispenser. This procedure enables the preparation of substantial quantities of lubricated bulk material to be later metered in the dispenser filling operation. Obviously, the lubricant can be added to the bulk substance at other stages of the dispenser filling cycle.

As an example of the results obtainable by our invention, five ounces of a fluoridated toothpaste rated at 200,000 centipoises at 25° C. was introduced into a conventional 6-ounce can. Nitrogen was employed as the propellent and pressurized to 90 p.s.i.g. A similar dispenser was prepared but had the internal walls thereof coated with a silicone oil of the dimethyl siloxane type having a viscosity of 300 centistokes. Under sustained dispensing conditions the lubricated dispenser emitted slightly less than double the amount of bulk compared to the unlubricated dispenser before the propellent escaped through the outlet valve. The length of time for dispensing the lubricated bulk was about one minute longer than the duration of dispensing the unlubricated bulk, which represented more than two times the length of dispensing time as compared to the unlubricated can.

Under substantially similar conditions as in the previous example, a commercial hair cream was packaged having an approximate viscosity of 250,000 centipoises at 25° C. The lubricated dispenser ejected more than double the amount of cream as compared to the unlubricated dispenser upon a sustained dispensing operation.

Rubber cement ranging in viscosity from 1,000 to 4,000 centipoises at 25° C. was similarly introduced into 6-ounce cans. The lubricated cans dispensed up to more than 4% bulk as compared to the unlubricated cans.

A solvent base rubber cement having a viscosity of 4,020 centipoises at 25° C. was similarly packaged with the exception that the internal walls of some of the cans were lubricated with 20% of coconut oil soap. When the dispenser contents were extruded on continuous actuation of the dispenser valve, approximately 4% more of the bulk was dispensed from the lubricated cans.

A number of dispensers were prepared in which the bulk substance packaged was commercial toothpaste ranging in viscosity from 130,000 centipoises at 25° C. to 300,000 centipoises at 25° C. and the propellent employed was nitrogen pressurized to approximately 100 p.s.i.g. The dispenser containers were either of the conventional tin plate or lacquer lined variety. Upon continuous actuation of the dispenser valve dispensers having their internal walls as well as their valve orifices lubricated with mineral oil having a viscosity of 200–210 Saybolt at 100° F. extruded approximately 9% to 15% more bulk than unlubricated dispensers. Composite lubricant layers were then adopted for these dispensers wherein paraffin wax having a melting point of 124–126° F. was initially applied over the interior walls of the dispenser container as well as the valve orifices. Mineral oil having a viscosity of 200–210 Saybolt at 100° F. was then applied over the wax layers. Continuous actuation of the dispenser valves resulted in extrusion of approximately 21% to 39% bulk than was possible from the unlubricated dispensers.

Visual observations were made on opened cans after extrusion and exhaustion of nitrogen had been completed. In all cases, the unlubricated internal surfaces of the cans showed gross amounts of toothpaste adhering to the surfaces. On cans which had been lubricated with mineral oil only, a lesser amount of toothpaste adhered to the inner surfaces. Those cans subjected to a wax coating with an applied mineral oil coating over the wax showed excellent drainage, with practically no paste adhering to the internal surfaces.

While certain bulk substances, propellents and lubricants have been enumerated, it will be understood that we intend to include within the scope of our invention all of those materials having desired and suitable properties that satisfy the criteria heretofore established in satisfying and accomplishing the teachings of our invention. Obviously, many types of lubricants and lubricating media, as well as combinations of lubricants and lubricating media can be employed. Therefore, our invention is in no sense limited and is defined by the scope of the appended claims.

We claim:

1. A dispenser comprising in combination: a container; a viscous bulk substance having a viscosity of at least 1000 centipoises at 20° C. which is to be dispensed, said substance partially filling said container; a pressurized medium in the remaining portion of said container which is insoluble in said viscous substance exerting pressure directly on the upper surfaces of said substance, the said pressurized medium being a propellent gas which acts as a piston against the upper surface of said substance; and a lubricating medium being present on the interior surfaces of said container to facilitate dispensing of said substance from said container by means of said pressurized medium said lubricating medium being incompatable and insoluble in said substance and being adherent to the inner surfaces of said container whereby the dispensing movement of said viscous bulk substance under the piston action of said gas occurs without cavitation of said substance and without an increase in bulk of said substance after dispensing due to the dissolving and fragmenting action of said gas on said substance.

2. A dispenser comprising in combination: a container having a valve controlled outlet orifice; a visous bulk substance having a viscosity of at least 1000 centipoises at 20° C. which is to be dispensed, said substance partially filling said container; a gas under pressure in the remaining portion of said container exerting pressure directly on the upper surfaces of said substance, said gas normally adapted to produce cavitation of said substance when the latter is dispensed from said container upon opening of said outlet orifice due to the dispensing of said substance from the container under piston-like pressure of said gas against said substance; and a lubricant on the interior surfaces of said container to facilitate dispensing of said substance from said container by means of said gas under pressure by minimizing said cavitation, said lubricant being incompatible and insoluble in said substance and being adhered to the interior surface of said container by a priming coating, the dispensed substance from said container being free from dissolved gas and being in a coherent mass which is not interspersed with gas bubbles due to weakness of said viscous substance.

3. A dispenser as claimed in claim 1 wherein said lubricating medium is lighter than said viscous substance and is added to said substance in an amount of from ½ to 10% of weight of said substance.

4. A dispenser as claimed in claim 2 wherein said priming coating is of paraffin wax.

References Cited in the file of this patent

UNITED STATES PATENTS

| | | |
|---|---|---|
| 2,504,482 | Goldman | Apr. 18, 1950 |
| 2,539,929 | Roberts | Jan. 30, 1951 |
| 2,562,111 | Michel | July 24, 1951 |
| 2,631,814 | Abplanalp | Mar. 17, 1953 |
| 2,715,481 | McGhie et al. | Aug. 16, 1955 |
| 2,723,200 | Pyenson | Nov. 8, 1955 |
| 2,816,691 | Ward | Dec. 17, 1957 |